(No Model.)
LA VERNE W. NOYES.
POLE SAWING MACHINE.
No. 529,566. Patented Nov. 20, 1894.
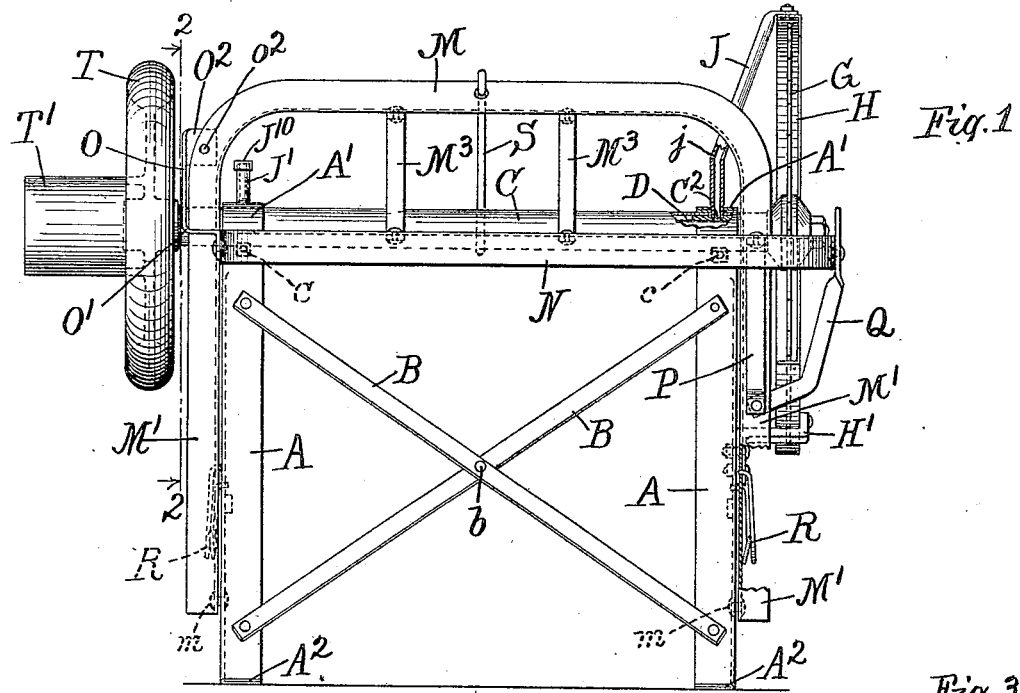
Fig. 1.
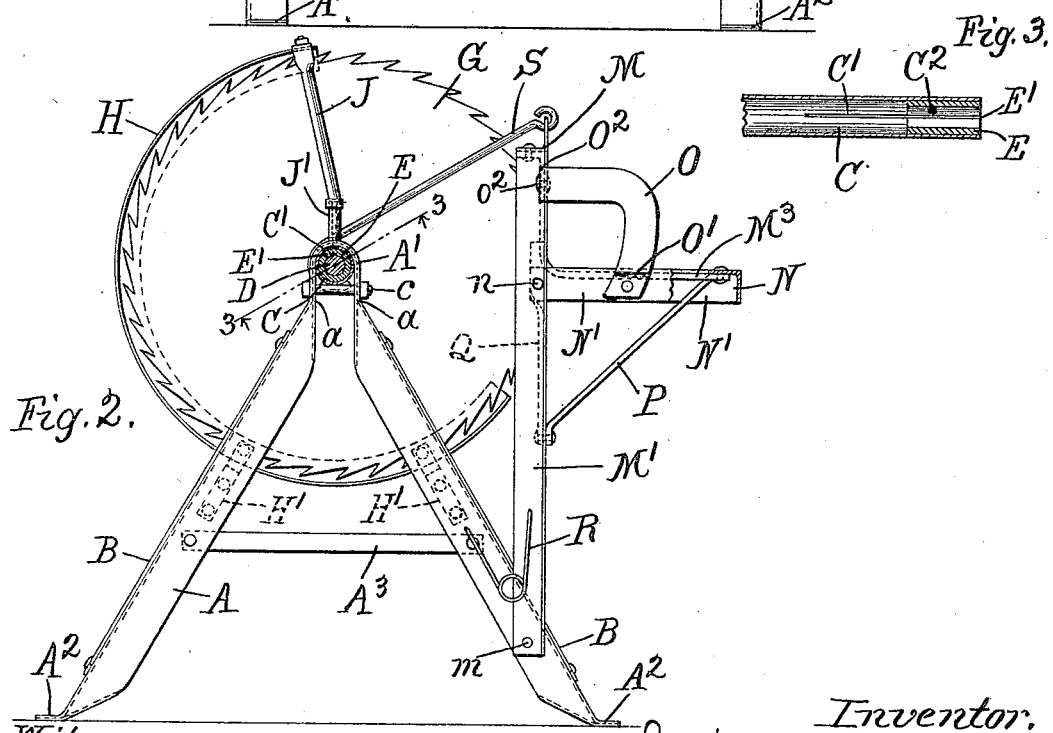
Fig. 2.
Fig. 3.
Witnesses.
E. T. Wray.
Jean Elliott.
Inventor.
La Verne W. Noyes
By Burton and Burton
his attys

UNITED STATES PATENT OFFICE.

LA VERNE W. NOYES, OF CHICAGO, ILLINOIS.

POLE-SAWING MACHINE.

SPECIFICATION forming part of Letters Patent No. 529,566, dated November 20, 1894.

Application filed April 2, 1894. Serial No. 506,035. (No model.)

*To all whom it may concern:*

Be it known that I, LA VERNE W. NOYES, a citizen of the United States, residing at Chicago, county of Cook, and State of Illinois, have invented certain new and useful Improvements in Pole-Sawing Machines, which are fully set forth in the following specification, reference being had to the accompanying drawings, forming a part thereof.

In the drawings,—Figure 1 is a front elevation of my improved pole or wood-sawing machine, certain small portions being broken away to disclose details in the rear and in vertical section at the break. Fig. 2 is a section at the line 2—2 on Fig. 1, showing the frame in side elevation, a portion of the carriage at one corner being broken away to show a detail beyond. Fig. 3 is a detail section of one of the shaft bearings at the line 3—3 on Fig. 2.

A A are the standards.

B B are diagonal braces which tie the standards together.

C is a pipe which connects the standards and which has bearings for the power shaft D. E represents the Babbitt or equivalent bushing at the bearings.

The standards are each made of a single piece of angle-iron bar, which has both lips or flanges flattened together for a distance intermediate the ends, as seen in Fig. 2, between the points $a\ a$, and folded or bent at that part to form a loop indicated by the letter A', which clasps the pipe C, in which the shaft-bearings are provided by means of the bushing, preferably Babbitt metal, E. At their ends the two lips of the angle-iron standards are flattened together to form the toes or feet $A^2\ A^2$, which rest upon the floor. The two legs diverging from the loop A' may be tied together by the bar $A^3$, and the two standards may be tied together by diagonal braces B B, crossing and secured together at $b$.

The pipe C, clasped by the standards as stated, at the loops A' A', is also clamped in said bends by bolts $c\ c$, which pass through both sides of the loop below the pipe. The pipe C is rifted for a distance from each end, as shown at C' C', and the Babbitt or other bushing, E, which forms a bearing in the pipe, is likewise rifted as shown at E'. When the bolts $c\ c$ are tightened, therefore, to clamp the loop A' about the pipe, it tends to contract the bearing of the shaft by closing up the rift C' and E', and this expedient thus becomes an efficient means for taking up lost motion in the bearing, as may be required from time to time, while the fact that both bearings of the shaft are in a continuous rigid piece of pipe, prevents the cramping of the bearings by any wrenching of the frame, so that although the frame is preferably securely braced as described, it is not necessary to brace it so strongly as would be necessary, in order, by means of such bracing alone, to prevent the cramping of the shaft-bearings, if they were independently provided upon the standards respectively.

For the saw G, I provide a guard H, made of angle-iron, formed into an arc of about two-hundred-and-forty degrees about the circumference of the saw, one lip being exterior and the other laterally adjacent at the outer side to the periphery of the saw. This guard H is held at the outer side by brackets H' H', fastened to the two lugs of the standard, and at the upper side it is held by a piece of pipe J, which is flattened at one end and bolted to the upper end of the guard H, and thence extends through the bend of the loop A' to the pipe C, into which it is screwed at the oil-hole $C^2$, and pins the pipe in the loop of the standard, so that it is prevented from turning therein. This pipe is pierced at $j$ to admit oil, and it thus serves as an oil cup in addition to performing the office of preventing the rotation of the pipe and bracing the guard H. A pipe nipple J' screwed into the oil-hole at the other bearing performs a similar function except as to bracing the guard, and also serves as an oil-cup and is provided with a cap $J^{10}$. The rift C is so located that the oil-hole does not lead directly to it, but on the contrary is forward of it, so that the rotation of the shaft tends to carry the oil from the oil-hole away from the rift, so that the rift does not become to any important extent a duct for the waste of the oil out of the bearing.

M, M' M' is the upright frame or rear guard of a rocking carriage for the logs or poles to be sawed. It is made of an angle-iron-bar folded to form two limbs M' M', at the ends of the horizontal portion M which is intermediate them. It is pivoted at the lower ends of these limbs to the forward legs of the standards, respectively, at m m, and is adapted to rock over these pivots to carry the pole against and back from the saw. The shelf or ledge for the pole is formed by an angle-iron-bar N, bent at right angles at the forward corners to form two arms N' N' which extend back to and are bolted against the legs M' M', respectively at a distance below the horizontal bar of the frame M, as seen at n. At the left hand end of the carriage, the shelf is supported by the angle-brace O, which is riveted to the vertical flange of the arm N' at the end of the carriage, and bent at O' to pass around the face flange of the angle-iron limb M' of the carriage, and back again at $O^2$, to pass behind the same flange to which it is riveted at $o^2$. At the right hand end, the shelf N is braced downwardly, it being necessary to keep the space above the shelf clear. P is such downwardly extending brace, being bolted at one end to the horizontal lip of the forward bar of the shelf N, and at the other end to the face lip of the limb M'. The same bolt or rivet which secures this brace at the lower end to the limb M' secures also the lower end of the stop Q, which, being suitably bent to pass up at the right point, extends up past the right hand end of the shelf and is bolted to the vertical flange of the right hand arm of the same and extends up past it for a sufficient distance to serve as a stop for the pole outside of the saw. This stop retains the end of the pole on a shelf of the carriage after the cut is made.

The portion of the frame M, M' M' which is above the level of the shelf, serves as the rear guard; and both the shelf and the rear guard are further filled out and completed by the straps $M^3 M^3$, which are riveted to the horizontal flange of the horizontal bar of said frame, and thence extend down with their forward surfaces in the vertical plane of the face of the limbs M' M', to or slightly below the plane of the face or upper surface of the horizontal flange of the shelf-bar N, and thence extend forward and are riveted under that flange at their forward ends.

R R are springs which react between the frame and carriage tending to hold the latter outward from the saw shaft. They are secured, one end to a limb of the carriage and one end to the forward leg of the standard at that side, as illustrated.

S is a link or check bar loosely connected to the carriage at the top, and extending therefrom back above the pipe C, on which it lies, the free end being hooked downward to engage the pipe and check the carriage at the proper point in the movement which the springs R R tend to give it away from the shaft.

T is a fly-wheel on the end of the shaft opposite the saw.

T' is a pulley, which is conveniently made integral with the fly-wheel to receive a belt by which the saw is driven.

I claim—

1. The frame comprising standards made of angle-iron-bar having the two lips or flanges flattened together face to face for a part of the length, and bent or folded at that part to form a loop; and the pipe having the shaft-bearings clasped and clamped in the loops of the standards: substantially as set forth.

2. In combination with the standards each made of a bar folded to form a loop between the ends, and a pipe having shaft-bearings and rifted at one side at and for a distance from such bearings, and clasped and clamped in the loops of the standards at such rifted part: substantially as set forth.

3. In combination with the standards each made of a bar folded to form a loop, and a pipe having bushings constituting shaft-bearings, said pipe being rifted at one side at and for a distance from such bearings, and the bushings being likewise rifted, the pipe being clasped and clamped in the loops of the standards at such rifted parts: substantially as set forth.

4. In combination with the frame, the saw journaled therein; the saw guard H; the pipe J, which constitutes the upper brace of the guard extending therefrom into the oil-hole of the shaft-bearing, and pierced above its lower end to adapt it to serve as an oil cup: substantially as set forth.

5. In combination with the frame and the saw journaled therein, the rocking carriage pivoted thereto and having the shelf and the rear upright guard M M' M' inside the saw, and the guard Q outside the saw in the vertical plane of the said upright guard, and extending downward to brace the shelf: substantially as set forth.

6. In combination with the standards, each made of bar folded to form a loop, and a pipe having shaft bearings clasped in the loops of the standards; tubes J J' which penetrate the loops and the pipe at the bearing to prevent the pipe from turning, and serve as oil-cups for the bearing: substantially as set forth.

In testimony whereof I have hereunto set my hand, in the presence of two witnesses, at Chicago, Illinois, this 29th day of March, 1894.

LA VERNE W. NOYES.

Witnesses:
 I. J. GIFFEN,
 ISAAC R. WOOD.